United States Patent [19]
Aoyagi et al.

[11] Patent Number: 5,270,599
[45] Date of Patent: Dec. 14, 1993

[54] MINIATURE MOTOR AND METHOD OF MAKING SAME

[75] Inventors: Norio Aoyagi; Yasuo Ohaku; Kouichi Koide, all of Matsudo, Japan

[73] Assignee: Mabuchi Motor Co., Ltd., Chiba, Japan

[21] Appl. No.: 918,565

[22] Filed: Jul. 22, 1992

[30] Foreign Application Priority Data

Jul. 25, 1991 [JP] Japan ................... 3-184957
Mar. 31, 1992 [JP] Japan ................... 4-075072

[51] Int. Cl.⁵ ............................ H02K 11/00
[52] U.S. Cl. .................. 310/71; 310/40 MM; 439/733
[58] Field of Search ............ 310/40 MM, 71, 242, 310/249; 439/733, 734, 746, 747, 751, 869, 870, 872, 873

[56] References Cited

U.S. PATENT DOCUMENTS

| | | | |
|---|---|---|---|
| 3,416,122 | 12/1968 | Kinkaid | 439/733 |
| 3,596,234 | 7/1971 | Sapienza | 439/733 |
| 4,220,393 | 9/1980 | Ammon et al. | 439/733 |
| 4,857,001 | 8/1989 | Nakano et al. | 439/733 |
| 5,071,372 | 12/1991 | Viselli et al. | 439/733 |

Primary Examiner—Steven L. Stephan
Assistant Examiner—E. To
Attorney, Agent, or Firm—McGlew and Tuttle

[57] ABSTRACT

A miniature motor including a case made of a metallic material and formed into a bottomed hollow cylindrical shape and having a permanent magnet fixedly fitted to the inner circumferential surface thereof, a rotor comprising an armature and a commutator, a case cap fitted to an open end of the case and having brushes making sliding contact with the commutator, and terminals electrically connected to the brushes; the rotor being rotatably supported by bearings provided on the bottom of the case and the case cap; in which the input terminals are mounted on the case cap made of a resin material and fixedly fitted to the case cap by means of lanced and raised retainer pieces formed on the input terminals near the outer end face of the case cap is disclosed. Also disclosed is a method of making miniature motors comprising a process of press-fitting input terminals into a case cap, and a process of forming lanced and raised retainer pieces in the vicinity of the outer end face of the case cap.

5 Claims, 3 Drawing Sheets

MINIATURE MOTOR AND METHOD OF MAKING SAME

BACKGROUND OF THE INVENTION

This invention relates generally to a miniature motor used for audio equipment, precision equipment, etc., and more specifically to improvements of means for fixedly fitting a case cap and input terminals comprising a miniature motor.

DESCRIPTION OF THE PRIOR ART

FIG. 1 is a longitudinal sectional view illustrating a miniature motor of a conventional type. In FIG. 1, reference numeral 1 refers to a case made of a metallic material, such as mild steel, formed into a bottomed hollow cylindrical shape and having an arc-segment-shaped permanent magnet 2 fixedly fitted on the inner circumferential surface thereof. In the case 1 disposed is a rotor 5 comprising an armature 3 facing the permanent magnet 2, and a commutator 4. Next, numeral 6 refers to a case cap made of an insulating material, fitted to an open end of the case 1. Numeral 7 refers to a brush provided in such a manner that the free end thereof makes sliding contact with the commutator 4, and disposed on the case cap 6, together with a terminal 8 electrically connected to the brush 7. Numerals 9 and 10 denote bearings, each fixedly fitted to the bottom of the case 1 and the central part of the case cap 6, respectively to rotatably support shafts 11 and 12 comprising the rotor 5.

With the above construction, when current is fed from the terminal 8 to the armature 3 via the brush 7 and the commutator 4 comprising the rotor 5, rotating force is imparted to the armature 3 existing in a magnetic field formed by the permanent magnet 2 fixedly fitted to the inner circumferential surface of the case 1, causing the rotor 5 to rotate, driving external equipment (not shown) via the shaft 11 on the output side.

Means for fixedly fitting the input terminal 8 to the case cap 6 in the miniature motor having the aforementioned construction include that shown in FIG. 2. That is, a serrated projection 13 is provided on the side edge of the input terminal 8, and press-fitted into a hole 14 provided on the case cap 6. In this case, the width $W_1$ of the hole 14 is made slightly smaller than the width $W_2$ of the serrated projection 13 on the input terminal 8. Thus, as the input terminal 8 is press-fitted from under into the hole 14, the projection 13 proceeds in the hole 14 while deforming or shaving off the side edge of the hole 14, holding the input terminal 8 securely in position.

With the above construction, even when external force P is applied to the input terminal 8 in the direction shown by an arrow in the figure, the input terminal 8 and the brush 7 connected thereto or formed integrally therewith can be held in place. The input terminal 8, however, which is held in place by frictional force between the projection 13 and the hole 14, has small resistance to the external force P. Furthermore, when the input terminal 8 is press-fitted into the hole 14, the projection 13 proceeds in the hole 14 while shaving off the side edge of the hole 14, as noted earlier. This causes the input terminal 8 to be deformed, or causes chips to adhere on the inside surface of the case cap 6 or on the surfaces of the input terminal 8, the brush 7, etc., resulting in deterioration in the characteristics of the motor.

Next, FIGS. 3 and 4 are a cross-sectional front view and a longitudinal sectional view illustrating another example of means for fixedly fitting the input terminal 8 to the case cap 6. Like parts are indicated by like reference numerals shown in FIG. 2. In FIGS. 3 and 4, numeral 15 refers to a lanced and raised retainer piece provided in advance in the central part of the input terminal 8. The size $t_1$ in the thickness direction of the hole 14 provided on the case cap 6 is made smaller than the size $t_2$ in the thickness direction of the lanced and raised piece 15. Thus, the input terminal can be locked to a predetermined location, as in the case of FIG. 2, by press-fitting the input terminal 8 from under into the hole 14.

The embodiment having the aforementioned construction has a better engaging and locking action than the embodiment shown in FIG. 2, due to the resiliency of the lanced and raised piece 15. But the strength to withstand the external force P in the direction shown by an arrow is small because of the frictional force between the lanced and raised piece 15 and the hole 14. In addition, there is a fear of chips generated when the input terminal 8 is press-fitted to the hole 14.

FIG. 5 is a longitudinal sectional view illustrating still another embodiment of means for fixedly fitting the input terminal 8 to the case cap 6. Like parts are indicated by like numerals used in FIG. 4. In the embodiment shown in FIG. 5, the lanced and raised piece 15 is formed in such a manner as to appear on the outer end face of the case cap 6 by the resiliency of the lanced and raised piece 15 when the input terminal 8 is press-fitted into the hole 14. This allows the lanced and raised piece 15 to act as a retaining stopper to withstand the external force P in the direction shown by the arrow.

There still remains a problem of chips generated, as in the case of the embodiment shown in FIG. 4, because the lanced and raised piece 15 proceeds while shaving off the inside surface of the hole 14 when the input terminal 8 is press-fitted into the hole 14. In addition, there is a likelihood of the size $t_3$ of the hole 14 in the thickness direction being larger than the thickness t of the input terminal 8, thus reducing the engaging and locking action caused by frictional force. Furthermore, there often occur unwanted phenomena of a gap C being formed between the free end of the lanced and raised piece 15 and the outer end face of the case cap 6, or of the free end of the lanced and raised piece not exposed completely on the outer end face of the case cap 6. This also poses a problem that the lanced and raised piece 15 cannot have a stopper action as expected.

SUMMARY OF THE INVENTION

It is the first object of this invention to provide a miniature motor whose input terminal 8 can be engaged and locked at a predetermined location positively, and which has a sufficient resistance to external pulling force.

It is the second object of this invention to provide a method of making the aforementioned miniature motor efficiently.

DETAILED DESCRIPTION OF THE EMBODIMENTS

Figure 5:
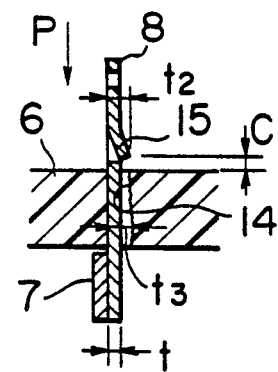
FIG. 5 is a longitudinal sectional view illustrating still another example of means for fixedly fitting an input terminal to a case cap.
Figure 6:
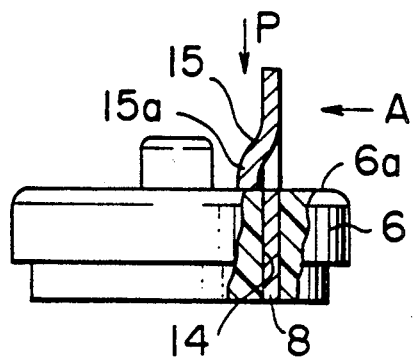
FIG. 6 is a partially sectional front view illustrating a case cap in an embodiment of this invention.
Figure 7:
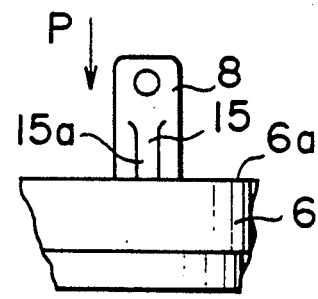
FIG. 7 is a diagram illustrating the essential part viewed from the direction shown by the arrow in FIG. 6.

FIG. 6 is a partially cross-sectional front view illustrating a case cap in an embodiment of this invention. FIG. 7 is a diagram illustrating the essential part viewed from the direction shown by the arrow in FIG. 6. Like parts are indicated by like numerals shown in FIGS. 3 and 5. In FIGS. 6 and 7, numeral 15 refers to a lanced and raised retainer piece formed on an input terminal 8 by a means which will be described later after the input terminal 8 is press-fitted into the hole 14 and engaged with or fitted to a predetermined location. The cross-sectional internal dimensions of the hole 14 provided on the case cap 6 is made essentially the same as the cross-sectional external dimensions of the input terminal 8.

With the aforementioned construction, since the input terminal 8 comes in close contact with the hole 14 provided on the case cap 6, and the free end 15a of the lanced and raised piece 15 positively comes in contact with the outer end face 6a of the case cap 6, the free end 15a acts as a stopper, increasing the retaining effect, even if external force P is exerted in the direction shown by the arrow. When the input terminal 8 is press-fitted into the hole 14, no chips are generated even when the external dimensions of the input terminal 8 is made essentially the same as the internal dimensions of the hole 14, because the lanced and raised piece 15 has not been formed on the input terminal 8. Thus, the surface and surrounding areas of the input terminal 8 and the brushes (not shown) can be kept clean.

Figure 8:
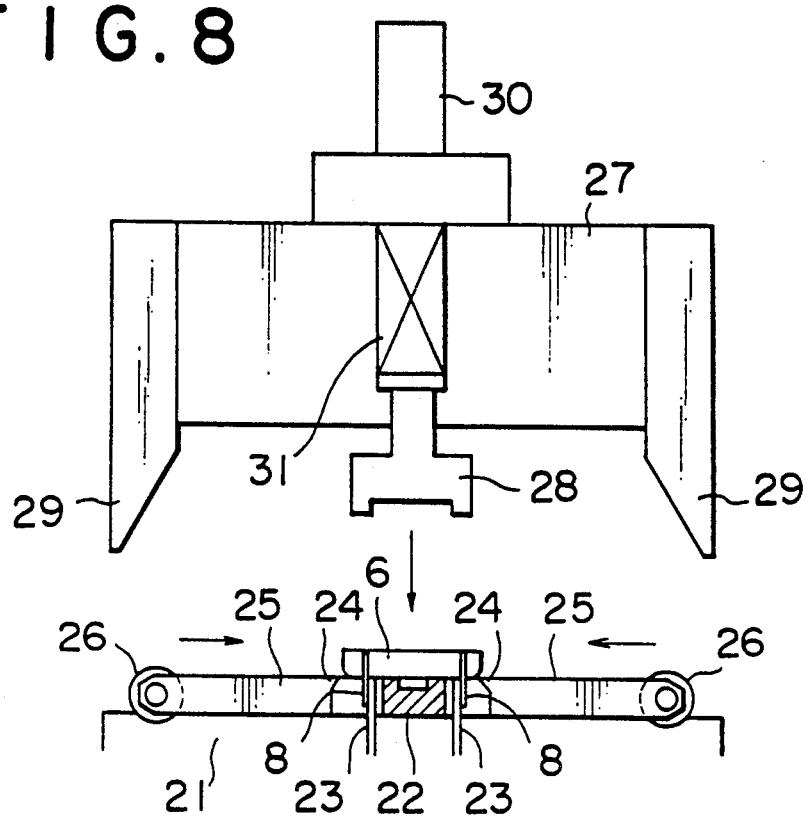
FIG. 8 is a diagram of assistance in explaining the construction of an input terminal fitting jig used in an embodiment of this invention.

FIG. 8 is a diagram of assistance in explaining the construction of an input terminal fitting jig in an embodiment of this invention. In FIG. 8, numeral 21 refers to a table having a holder 22 at the central part thereof, and a receiving blade 23 at a location corresponding to the location to which the input terminal 8 of the case cap 6 is fitted. Numeral 24 refers to a lancing and raising blade 24 provided in such a manner that the lancing and raising blade 24 can be engaged with or disengaged from the receiving blade 23, and moved horizontally on the table 21 via a driving member 25. Numeral 26 refers to rollers rotatably provided at the rear ends of the driving member 25 having the lancing and raising blade 24.

Next, numeral 27 refers to a working member formed in a vertically movable manner via a guide (not shown) provided on the table 21; with a press-fitting member 28 provided at the central part thereof in such a manner as to be vertically movable with the working member 27, and roller retainers 29 that can be engaged with or disengaged from the rollers 26. Numeral 30 refers to a cylinder connecting shank, and 31 to a spring; each provided in such a manner as to drive the working member 27 and the press-fitting member 28.

Figure 9:
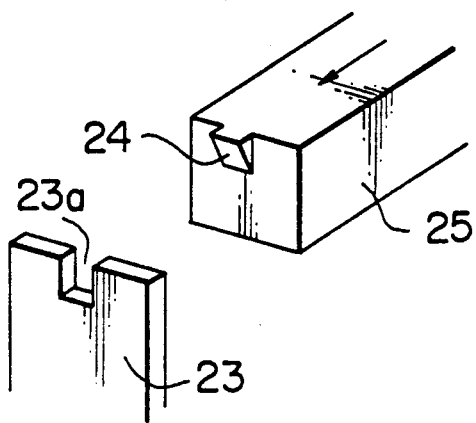
FIG. 9 is an enlarged perspective view illustrating a receiving blade and a lancing and raising blade shown in FIG. 8.

FIG. 9 is an enlarged perspective view illustrating the receiving blade 23 and the lancing and raising blade 24 shown in FIG. 8. Like parts are indicated by like numerals shown in FIG. 8. In FIG. 9, numeral 23a refers to a blade formed by cutting the upper end of the receiving blade 23 into a square or U shape in such a manner as to engage with the lancing and raising blade 23 protruded in a triangular shape in longitudinal section. The receiving blade 23 and the lancing and raising blade 24 should preferably be formed using a jig material, such as tool steel. The upper end surfaces of the receiving blade 23 and the lancing and raising blade 24 are formed in such a manner as to be flush with the upper end surface of the holder 22, that is, the outer end surface of the case cap 6.

Figure 1:
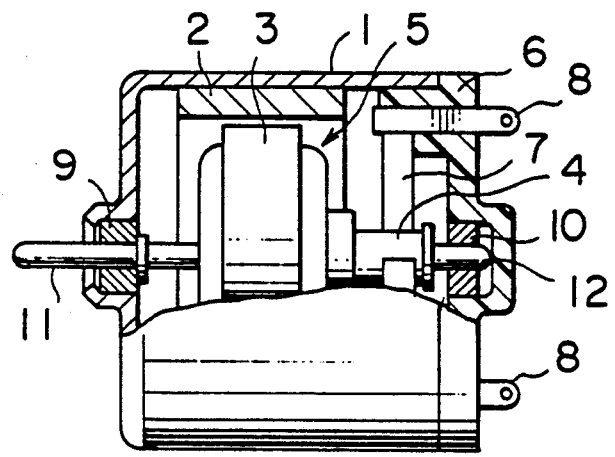
FIG. 1 is a longitudinal section front view illustrating a miniature motor of a conventional type.
Figure 2:
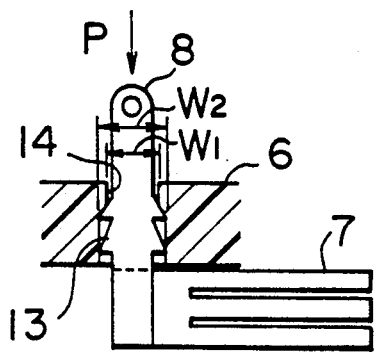
FIG. 2 is a partially cross-sectional view illustrating an example of means for fixedly fitting an input terminal to a case cap.
Figure 3:
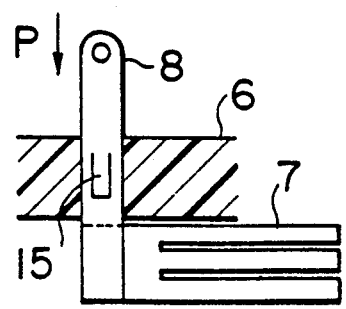
FIGS. 3 and 4 are a cross-sectional front view illustrating another example of means for fixedly fitting an input terminal to a case cap, and a longitudinal sectional view illustrating an input terminal, respectively.
Figure 4:
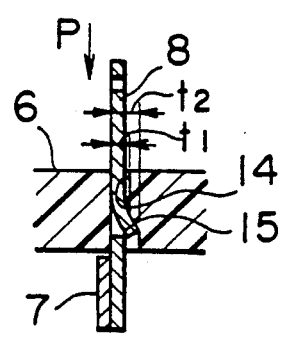

With the above construction, when a case cap 6 is placed and positioned on the holder 22, as shown in FIG. 8, with the inside side surface upward, the input terminal 8 (in the state where the brush 7 is bonded thereto, as shown in FIGS. 3 and 4. In this case, the lanced and raised piece 15 has not been formed) is inserted, and the working member 27 and the press-fitting member 28 are lowered, the input terminal 8 is press-fitted into the case cap 6 by the press-fitting member 28. As the working member 27 is lowered while the press-fitting member 28 is kept forced slightly onto the case cap 6, the roller retainers 29 are engaged with the rollers 26, causing the driving member 25 to move to the side of the input terminal 8. Thus, the lancing and raising blade 24 proceeds and cut into the input terminal 8, and engages with the receiving blade 23 to form the lanced and raised piece 15. As a result, the input terminal 8 is engaged with and fitted to the case cap 6. Upon completion of the engaging and fitting operation, the component members are operated in the reversed direction to the direction shown by the arrow to remove the case cap 6. Then, a new case cap is loaded to repeat the above operations.

The table below shows the measurement results of the pulling force of the input terminals. Measurement was made on 20 pieces each of miniature motors of the same specifications; No. 1 and No. 2 in the table being those shown in FIGS. 3, 4 and 5.

| Item | Classification Conventional type | | (Unit: kgf) |
|---|---|---|---|
| | No. 1 | No. 2 | This invention |
| Average value | 3.36 | 4.86 | 7.80 |
| Standard deviation | 0.19 | 0.30 | 0.59 |
| Maximum value | 3.97 | 5.49 | 8.90 |
| Minimum value | 3.12 | 4.16 | 6.86 |

As is evident from the table, the input terminals of the conventional type have low resistance to pulling force, and the input terminal 8 even fell off with the No. 1 sample. Furthermore, chips were generated and the brush 7 was deformed when the input terminal 8 was press-fitted into the case cap 6 with the No. 2 sample. With the samples of this invention, on the other hand, the input terminals 8 had largely high resistance to pulling force, and did not involve generation of chips nor deformation of the brush 7, and it was confirmed that motor performance and reliability are substantially improved.

In this embodiment, description has been made about examples in which the lanced and raised retainer piece 15 is provided inside the input terminal 8. But the lanced and raised piece 15 may be provided outside the input terminal 8 or at other appropriate locations, depending on the direction in which the input terminal 8 is provided. In short, lancing and raising operations may be carried out in the thickness direction of the input terminal 8. The shape and size of the lanced and raised piece may be appropriately selected, taking into account the material, shape and size of the input terminal 8. Furthermore, as the means for driving the input terminal fitting jig, known driving means, other than cylinders may also be used.

This invention having the aforementioned construction and operation can achieve the following effects.

(1) Since the lanced and raised retainer piece can positively come in contact with the outer end face of the case cap, acting as a stopper, a sufficient resistance to external pulling force is imparted to the input terminal, eliminating the accidental falling of input terminals, improving reliability substantially.

(2) This invention has such a construction that the lanced and raised piece is provided after the input terminal is press-fitted to the case cap, the input terminal can be easily press-fitted into the case cap, producing virtually no chips during press-fitting, unlike the conventional input terminals, improving motor characteristics.

(3) Since the lanced and raised piece is formed in the same process as the press-fitting of the input terminal to the case cap, miniature motors of this invention can be manufactured in essentially the same process as the conventional miniature motors, without increase in the number of processes.

(4) In connection with the effects mentioned in (2) above, there is no fear of the input terminal being press-fitted in an inclined state, or being deformed. This is extremely effective in manufacturing miniature motors having small input terminals.

What is claimed is:

1. A miniature motor comprising:
   a case formed of metallic material, said case having a bottomed hollow cylindrical shape;
   a permanent magnet fixedly fitted to an inner circumferential surface of said case;
   a rotor including an armature mounted facing said permanent magnet, and a commutator;
   a case cap formed of a resin material conected with brushes making sliding contact with said commutator;
   a bearing provided on each of said bottom of said case and said case cap for rotatably supporting said rotor; and
   input terminals press-fitted to said resin material of said case cap, said input terminals including a lanced and raised retainer piece formed adjacent an outer end face of said cap to define a free end of said lanced and raised piece maintained in contact with outer end face of said case cap upon said input terminals being press-fitted.

2. A miniature motor according to claim 1, wherein:
   said case cap is provided with holes for receiving said input terminals upon said input terminals being press-fitted, said holes having a lateral dimension which is substantially the same as a cross-sectional dimension of said input terminals.

3. A method of manufacturing a miniature motor formed of a case made of a metallic material with a bottomed hollow cylindrical shape, and having a permanent magnet fixedly fitted to the inner circumferential surface thereof, a rotor comprising an armature, which faces said permanent magnet, and a commutator, and a case cap having brushes making sliding contact with said commutator, and an input terminal electrically connected to said brushes, said rotor being rotatably supported by bearings provided on the bottom of said case and said case cap, said method of manufacturing a miniature motor comprising the steps of press-fitting said input terminal into said case on said input terminal in the vicinity of the outer end face of said cap, forming a lanced and raised retainer piece on said input terminal in the vicinity of the outer end face of said cap wherein an end of said lanced and raised retainer piece is forced into permanent contact with said outer end face of said cap during said step of press-fitting.

4. A miniature motor formed by the steps of:
   providing a case formed of metallic material, said case having a bottomed hollow cylindrical shape;
   fixedly fitting a permanent magnet to an inner circumferential surface of said case;
   mounting a rotor including an armature facing said permanent magnet and a commutator;
   providing a case cap formed of a resin material and connecting brushes in sliding contact with said commutator;
   providing a bearing on each of said bottom of said case and said case cap for rotatably supporting said rotor; and
   press-fitting input terminals to said case cap resin material, said input terminals including a retainer piece lanced and raised from said input terminal, said retainer piece being positioned adjacent an outer end face of said cap to define a free end of said lanced and raised piece and being poced into contact and maintained in contact with outer end face of said case cap upon said input terminals being pressed-fitted.

5. A miniature motor formed according to claim 4, further comprising the steps of:
   forming holes in said cap to receive said input terminals, said holes being formed with a lateral dimension which is substantially the same as a cross sectional dimension of said input terminals.

* * * * *